(12) United States Patent
Zhang

(10) Patent No.: US 10,152,172 B2
(45) Date of Patent: Dec. 11, 2018

(54) KEYBOARD DEVICE AND KEYBOARD CONTROL METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Xue-Qin Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 162 days.

(21) Appl. No.: 15/264,608

(22) Filed: Sep. 14, 2016

(65) Prior Publication Data

US 2017/0139524 A1 May 18, 2017

(30) Foreign Application Priority Data

Nov. 18, 2015 (CN) .......................... 2015 1 0797397

(51) Int. Cl.
*G06F 3/041* (2006.01)
*G06F 3/0354* (2013.01)
*G06F 3/0488* (2013.01)
*G06F 3/0489* (2013.01)
*G06F 3/16* (2006.01)

(52) U.S. Cl.
CPC ........ *G06F 3/0416* (2013.01); *G06F 3/03547* (2013.01); *G06F 3/04883* (2013.01); *G06F 3/04886* (2013.01); *G06F 3/04897* (2013.01); *G06F 3/16* (2013.01); *G06F 2203/0381* (2013.01)

(58) Field of Classification Search
None
See application file for complete search history.

(56) References Cited

U.S. PATENT DOCUMENTS

2013/0249802 A1* 9/2013 Yasutake ................. G06F 3/016
345/168
2015/0261264 A1* 9/2015 Brown ................. G06F 3/0221
345/174
2016/0202778 A1* 7/2016 Su ............................ G06F 1/16
345/168

* cited by examiner

*Primary Examiner* — Nicholas Lee
(74) *Attorney, Agent, or Firm* — ScienBiziP, P.C.

(57) ABSTRACT

A keyboard device coupled to an electronic device includes a board, a control panel, and a sound device. The control panel coupled to the board for inputting an operating command further includes a first touch screen, a second touch screen, and a touch pad. The first touch screen can provide one of a handwriting input, a key input and a drawing input to the board as the operating command, the second touch screen can provide a number input to the board as the operating command, and the touch pad can provide a cursor control input to the board as the operating command. The sound device coupled to the board makes a sound based on the operating command received by the board.

11 Claims, 4 Drawing Sheets

KEYBOARD DEVICE AND KEYBOARD CONTROL METHOD

CROSS-REFERENCE TO RELATED APPLICATIONS

This application claims priority to Chinese Patent Application No. 201510797397.6 filed on Nov. 18, 2015, the contents of which are incorporated by reference herein.

FIELD

The subject matter herein generally relates to data input.

BACKGROUND

Touch screens are popular for use as displays and as user input devices on many devices. However, part of screen is covered by an input interface when a user is inputting via the input interface.

BRIEF DESCRIPTION OF THE DRAWINGS

Implementations of the present technology will now be described, by way of example only, with reference to the attached figures.

DETAILED DESCRIPTION

Figure 1:
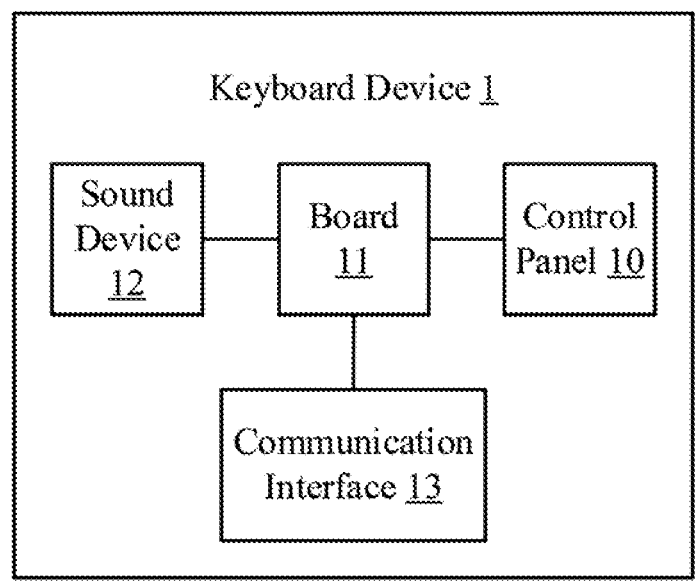
FIG. 1 is a block diagram of one embodiment of a keyboard device including a control panel.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts can be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates an embodiment of a keyboard device 1. In the embodiment, the keyboard device 1 can include a control panel 10, a board 11, a sound device 12, and a communication interface 13. The control panel 10 can receive an input from a user to input an operating command. The board 11 can receive the operating command from the control panel 10, and provide the operating command to an external device coupled to the keyboard device 1 via the communication interface 13. The sound device 12 can make a sound when the user provides the input to the control panel 10. The control panel 10, the board 11, the sound device 12, and the communication interface 13 are coupled to each other. The keyboard device 1 further includes a cover to protect the control panel 10. The cover can be made of aluminum alloy, stainless steel, or hard plastic. In at least one embodiment, the board 11 is installed between the control panel 10 and the cover. In at least one embodiment, the operating command can by generated from a handwriting input, a key input, a drawing input, a number input, and a cursor control input.

Figure 2:
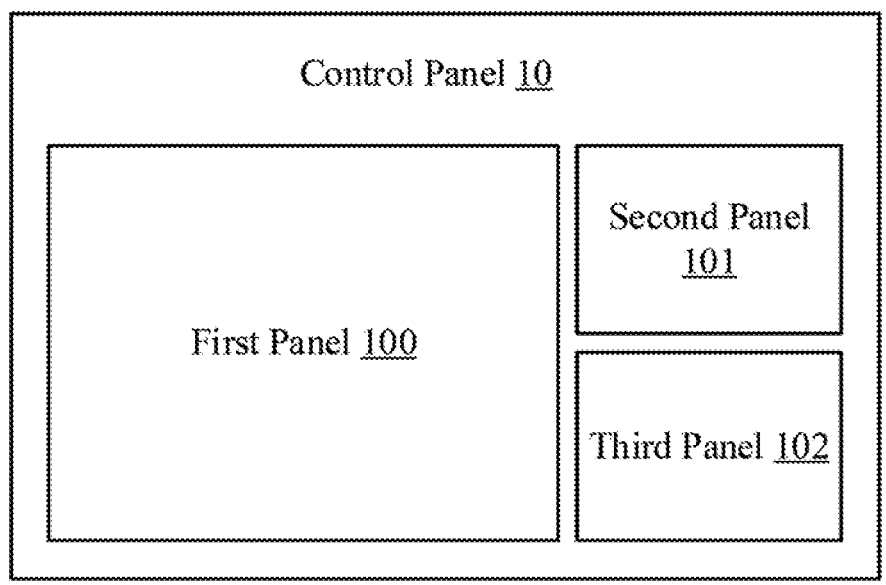
FIG. 2 is a block diagram of one embodiment of a control panel in the keyboard device of FIG. 1.

FIG. 2 illustrates an embodiment of a control panel 10 of the keyboard device 1. In the embodiment, the control panel 10 includes a first panel 100, a second panel 101, and a third panel 102, all independently set on the control panel 10.

In at least one embodiment, the first panel 100 can be a first touch screen. The first panel 100 can display a plurality of keys in a conventional keyboard layout including a plurality of alphanumeric keys, function keys, and modifier keys. The first panel 100 can be a liquid crystal display (LCD) touch screen or an organic light emitting diode (OLED) touch screen to sense at least one touch point on the first panel 100.

In at least one embodiment, the first panel 100 of the keyboard device 1 can be used in a plurality of operating modes. The plurality of operating modes includes a keyboard mode, a handwriting mode, and a drawing mode. When the first panel 100 is used in the keyboard mode, the first panel 100 can show a keyboard according to one of a plurality of keyboard layouts such as that of the United States layout. The user can provide a key input with finger or stylus. When the first panel 100 is used in the handwriting mode, the user can provide a handwriting input with finger or stylus. When the first panel 100 is used in the drawing mode, the user can provide a drawing input with finger or stylus. In the embodiment, the user can set a background of the touch screen in first panel 100.

In at least one embodiment, the board 11 can include a signal recognition circuit. The signal recognition circuit can be coupled to the sound device 12. The signal recognition circuit can detect a touch on a key shown by the first panel 100 in the keyboard mode, and provide to the sound device 12 a sound command corresponding to the touched key. The sound device 12 can make a sound based on the sound command. For example, when the user touches the key "A" shown by the first panel 100, the signal recognition circuit can detect the touch on the key "A" and provide the sound command to the sound device 12. Thus, the sound device 12 can make the sound of the letter "A" phonetically. In at least one embodiment, a time interval between the touch detected by the first panel 100 and the sound made by the sound device 12 can be set by user, such as 0.5 second. In addition, when the first panel 100 is used in the keyboard mode, the first panel 100 can be covered by a keyboard cover. The keyboard cover includes a surface on which symbols of the keys are set according to the keyboard layout. The keyboard cover can be made of rubber with high adsorbability or any other materials.

In at least one embodiment, the signal recognition circuit can detect handwriting on the first panel 100 in the handwriting mode, and recognize the handwriting as a character. The recognized character can be shown on the first panel 100 using a user-selected typeface or in a handwriting font.

In at least one embodiment, the second panel 101 can be a number input panel for the user to input numbers or arithmetical symbols. In at least one embodiment, the second panel 101 can be a second touch screen for the user to input the numbers or the symbols.

In at least one embodiment, the third panel 102 can be a cursor control panel for the user to control a cursor. In at least one embodiment, the third panel 102 can be a touch pad to control the cursor. The board 11 can detect a touch on the third panel 102 and determine coordinates of the touch by detecting a signal change in the board 11, such as a change of capacitance value. Thus, the board 11 can recognize touch and determine a corresponding position, motion, and click of the cursor.

In at least one embodiment, the sound device 12 can be a loudspeaker. In at least one embodiment, the sound device 12 can include interface for phone connector. In at least one embodiment, the communication interface 13 can be a customized connector or a standard connector such as USB connector or PS/2 connector. In at least one embodiment, the communication interface 13 can adopt customizable protocols or follow existing standards or de facto standards such as BLUETOOTH, ETHERNET, IEEE 802.11 and IEEE 802.15 series, Wireless USB, or telecommunication standards such as GSM, CDMA2000, TD-SCDMA, WiMAX, 3GPP-LTE, and TD-LTE.

Figure 3:
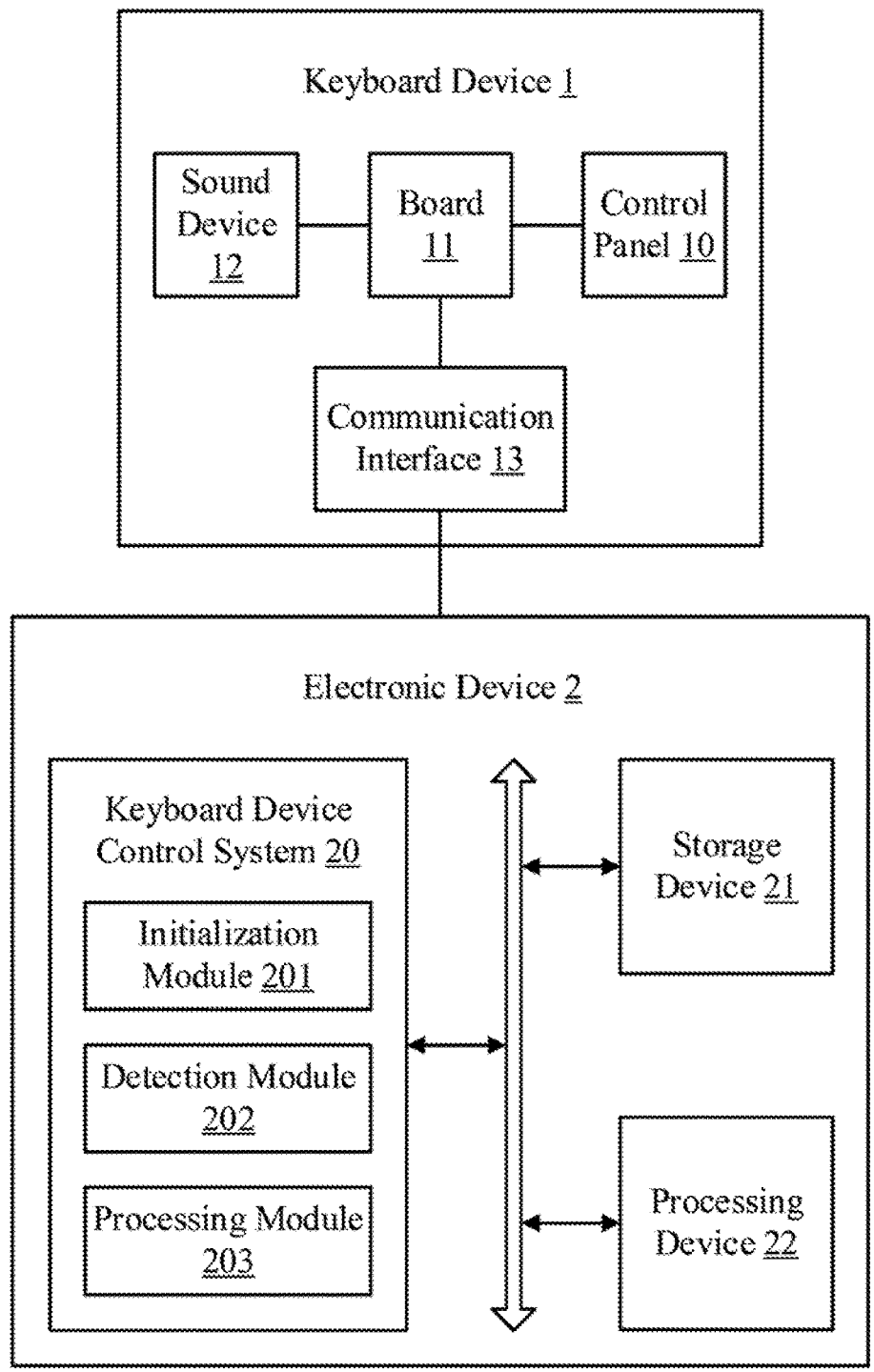
FIG. 3 is a block diagram of one embodiment of an electronic device including a keyboard device control system and coupled to a keyboard device.

FIG. 3 illustrates an embodiment of an electronic device 2 including a keyboard device control system 20 and coupled to the keyboard device 1 through the communication interface 13 of FIG. 1. In the embodiment, the electronic device 2 can include a storage device 21 and a processing device 22. The storage device 21 can be coupled to the processing device 22 via a system bus. The storage device 21 can store a plurality of instructions. When instructions are executed by the processing device 22, the processing device 22 receives a plurality of operating modes of the control panel 10 from the keyboard device 1, and generates information indicating associations between the plurality of operating modes and a plurality of application programs stored in the storage device 21. The processing device 22 detects a specific application program selected by the processing device 22, and determines a specific operating mode for the control panel 10 based on the specific application program, according to the generated information.

In at least one embodiment, the processing device 22 can receive a plurality of operating modes of the control panel 10 to generate information, including associations between the plurality of operating modes and a plurality of application programs, and store the generated information in the storage device 21. In the embodiment, the information is presented as a table indicating each of the plurality of the application programs in the electronic device 2 as associated with one of the plurality of operating modes of the control panel 10. In the embodiment, the plurality of operating modes includes a keyboard mode, a handwriting mode, and a drawing mode.

In at least one embodiment, the processing device 22 can detect a specific application program selected from the plurality of application programs stored in the storage device 21.

In at least one embodiment, the processing device 22 can determine a specific operating mode for the control panel 10 based on the specific application program according to the generated information and switch the control panel 10 to the specific operating mode to shown an input interface. In the embodiment, the processing device 22 can look up the table to select the specific operating mode associated with the specific application program. Therefore, the control panel 10 can adaptively switch its operating mode without additional input.

The storage device 21 can be a non-volatile computer readable storage medium that can be electrically erased and reprogrammed, such as read-only memory (ROM), random-access memory (RAM), erasable programmable ROM (EPROM), electrically EPROM (EEPROM), hard disk, solid state drive, or other forms of electronic, electromagnetic, or optical recording medium. In at least one embodiment, the storage device 21 can include interfaces that can access the aforementioned computer readable storage medium to enable the electronic device 2 to connect to and access such computer readable storage medium. In at least one embodiment, the storage device 21 can be a smart media card, a secure digital card, or a flash card.

The processing device 22 can be a central processor (CPU), a graphic processor (GPU), a system on chip (SoC), a field-programmable gate array (FPGA), a processing unit of basic input output system (BIOS), or a controller for executing the program instructions in the storage device 21. The storage device 21 can use static RAM (SRAM), dynamic RAM (DRAM), EPROM, EEPROM, flash memory, or other types of computer memory. The processing device 22 can further include or comprise an embedded system or an application specific integrated circuit (ASIC) having embedded program instructions.

In at least one embodiment, the electronic device 2 can be a mobile phone, a tablet, a desktop, a notebook, or other electronic device. FIG. 3 illustrates only one example of an electronic device 2, the electronic device 2 in other embodiments can include more or fewer components than as illustrated, or have a different configuration of the various components.

In at least one embodiment, the keyboard device control system 20 can include one or more modules, for example, an initialization module 201, a detection module 202, and a processing module 203. "Module," as used herein, refers to logic embodied in hardware or firmware, or to a collection of software instructions, written in a programming language, such as, JAVA, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable medium include CDs, DVDs, BLU-RAY, flash memory, and hard disk drives.

The initialization module 201 receives a plurality of operating modes of the control panel 10 to generate information including associations between the plurality of operating modes and a plurality of application programs, and stores the generated information in the storage device 21. The detection module 202 detects a specific application program selected by the processing device 22. The processing module 203 determines a specific operating mode for the control panel 10 based on the specific application program according to the generated information, and switches the control panel 10 to the specific operating mode.

Figure 4:
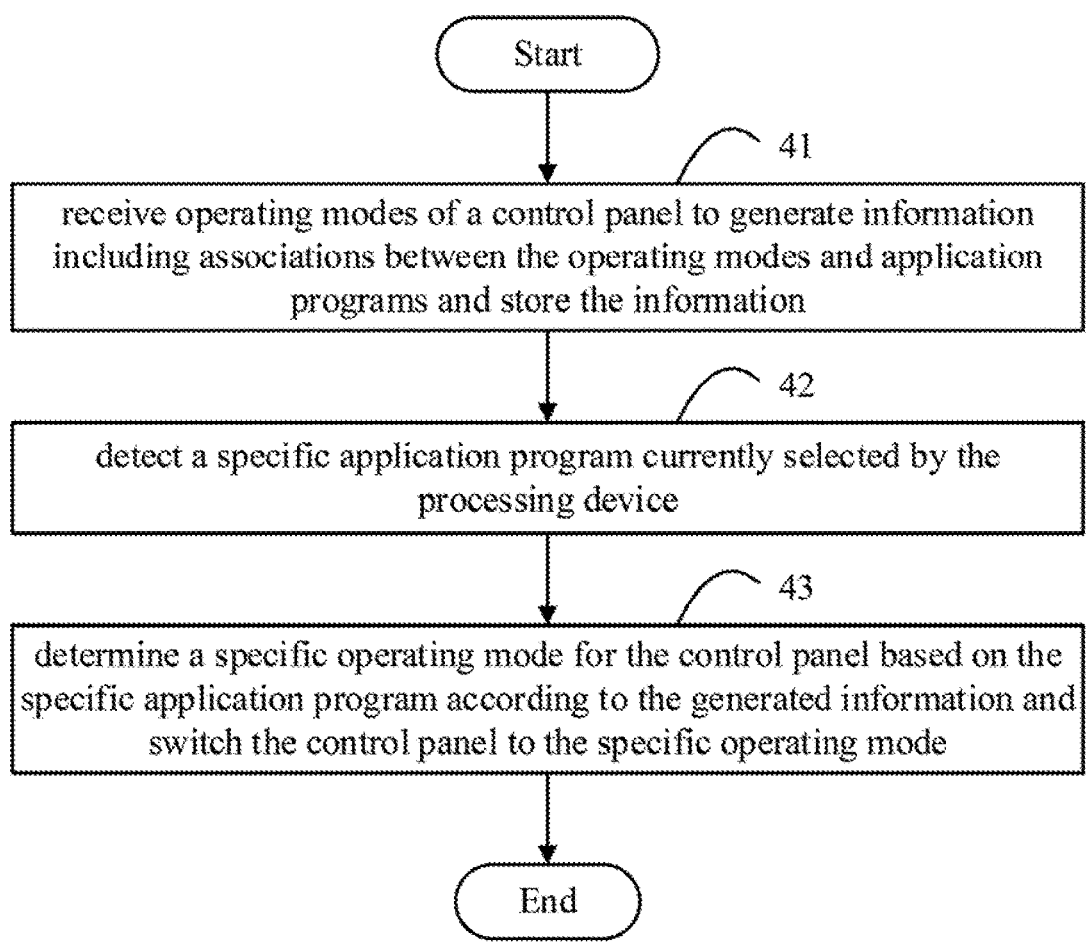
FIG. 4 illustrates a flowchart of one embodiment of a keyboard device control method for the electronic device of FIG. 3.

FIG. 4 illustrates a flowchart in accordance with an example embodiment. The example method is provided by way of example, as there are a variety of ways to carry out the method. The method described below can be carried out using the configuration illustrated in FIG. 3, for example, and various elements of these figures are referenced in explaining example method. Each block shown in FIG. 4 represents one or more processes, methods, or subroutines, carried out in the example method. Furthermore, the order of blocks is illustrative only and can change. Additional blocks can be added or fewer blocks can be utilized without departing from this disclosure. The example method can begin at block 41.

At block 41, the initialization module 201 receives a plurality of operating modes of the control panel 10 to generate information including associations between the plurality of operating modes and a plurality of application programs, and stores the generated information in the storage device 21.

In at least one embodiment, the first panel 100 of the control panel 10 in the keyboard device 1 can be used in the plurality of operating modes, and the plurality of application programs stored in the storage device 21 can be executed by the processing device 22. The information is a table indicating an association between each application programs in the electronic device 2 and each operating mode of the first panel 100.

In at least one embodiment, the plurality of operating modes are a keyboard mode, a handwriting mode, and a drawing mode. Thus, the user can set a typed or handwritten document program to correspond to the keyboard mode or the handwriting mode, set a computer graphics program to correspond to the drawing mode, and set an electronic signature system to correspond to the handwriting mode.

At block 42, the detection module 202 detects a specific application program selected by the processing device 22. In the embodiment, the specific application program is one of the plurality of application programs stored in the storage device 21.

In at least one embodiment, the processing device 22 can execute more than one of the plurality of application programs at the same time. However, only the specific application program can receive the input when the user selects the specific application program. In at least one embodiment, the user can select more than one specific application programs to receive the input.

At block 43, the processing module 203 determines a specific operating mode for the control panel 10 based on the specific application program according to the generated information and switches the control panel 10 to the specific operating mode to shown an input interface for the specific operating mode.

In at least one embodiment, the processing module 203 can look up the table to select the specific operating mode corresponding to the specific application program. If the current operating mode of the first panel 100 in the control panel 10 is the specific operating mode, the current operating mode is not changed by the processing module 23. If the current operating mode of the first panel 100 in the control panel 10 is different from the specific operating mode, the processing module 203 will switch the current operating mode to the specific operation mode.

For example, if the detection module 202 detects that the specific application program selected by the processing device 22 is a document program, the processing module 203 can switch the first panel 100 to the keyboard mode and show a keyboard interface. If the detection module 202 detects that the specific application program selected by the processing device 22 is a whiteboard program, the processing module 203 can switch the first panel 100 to the handwriting mode and show a whiteboard interface. If the detection module 202 detects that the specific application program selected by the processing device 22 is a computer graphics program, the processing module 203 can switch the first panel 100 to the drawing mode and show a drawing interface.

In at least one embodiment, the electronic device 2 can detect a specific application program selected by the processing device 22, and switch the first panel 100 of the control panel 10 to the specific operating mode corresponding to the specific application program. Therefore, the control panel 10 can adaptively switch its operating mode without additional input.

In at least one embodiment, the first panel 100, the second panel 101, and the third panel 102 are each independently installed in the control panel 10. The first panel 100, the second panel 101, and the third panel 102 are three independent touchscreen panels installed in the control panel 10. The three independent touchscreen panels can be three kinds of touchscreen panels selected according to the functions of the inputs. The three independent touchscreen panels can be selected based on appropriate display resolution and touch sensitivity according to their functions.

In at least one embodiment, the first panel 100, the second panel 101, and the third panel 102 can be integrated into a single touchscreen panel. The signal touchscreen panel can show separators to divide the touchscreen panel into three panels.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims.

What is claimed is:
1. A keyboard device, comprising:
a board;
a control panel coupled to the board to input an operating command to the board, comprising:
a first touch screen coupled to the board to provide one of a handwriting input, a key input and a drawing input to the board as the operating command;
a second touch screen coupled to the board to provide a number input to the board as the operating command; and
a touch pad coupled to the board to provide a cursor control input to the board as the operating command;
a sound device coupled to the board to make a sound based on the operating command received by the board; and
a communication interface coupled to the board to communicate with an electronic device;
wherein the electronic device comprises:
a processing device; and
a storage device coupled to the processing device and storing a plurality of instructions which, when executed by the processing device, causes the processing device to:
receive a plurality of operating modes of the control panel from the keyboard device;
generate information indicating associations between the plurality of operating modes and a plurality of application programs stored in the storage device;
store the generated information in the storage device;

detect a specific application program selected by the processing device; and determine a specific operating mode for the control panel based on the specific application program according to the generated information.

2. The keyboard device according to claim 1, wherein the generated information is a table indicating that each of the plurality of the application programs is associated with one of the plurality of operating modes.

3. The keyboard device according to claim 1, wherein the plurality of operating modes are a keyboard mode, a handwriting mode, and a drawing mode.

4. The keyboard device according to claim 1, further comprising instructions which when executed by the processing device cause the processing device to:
   switch the control panel to the specific operating mode to show an input interface of the first touch panel; and
   provide an input to the specific application program when receiving the input based on the input interface.

5. The keyboard device according to claim 1, wherein the specific application program is one of the plurality of application programs, and the specific operating mode is one of the plurality of operating modes.

6. The keyboard device according to claim 1, wherein the board comprises a signal recognition circuit coupled to the sound device and detecting a touch on the first touch screen, and the sound device makes the sound after the touch is detected.

7. A keyboard device, comprising:
   a board;
   a communication interface coupled to the board to output an operating command received from the board; and
   a control panel coupled to the board, comprising:
   a first panel coupled to the board to provide one of a handwriting input, a key input and a drawing input to the board as the operating command;
   a second panel coupled to the board to provide a number input to the board as the operating command; and
   a third panel coupled to the board to provide a cursor control input to the board as the operating command;
   wherein an electronic device coupled to the communication interface comprises:
   a processing device; and
   a storage device coupled to the processing device and storing a plurality of instructions which, when executed by the processing device, causes the processing device to:
   receive a plurality of operating modes of the control panel from the keyboard device;
   generate information indicating associations between the plurality of operating modes and a plurality of application programs stored in the storage device;
   store the generated information in the storage device;
   detect a specific application program selected by the processing device; and
   determine a specific operating mode for the control panel based on the specific application program according to the generated information.

8. The keyboard device according to claim 7, wherein the generated information is a table indicating that each of the plurality of the application programs is associated with one of the plurality of operating modes.

9. The keyboard device according to claim 7, wherein the plurality of operating modes are a keyboard mode, a handwriting mode, and a drawing mode.

10. The keyboard device according to claim 7, wherein the specific application program is one of the plurality of application programs, and the specific operating mode is one of the plurality of operating modes.

11. The keyboard device according to claim 7, wherein the board comprises a signal recognition circuit coupled to the sound device and detecting a touch on the first touch screen and the sound device makes the sound after the touch is detected.

\* \* \* \* \*